Patented Aug. 9, 1938

2,126,374

UNITED STATES PATENT OFFICE 2,126,374

PRODUCT BASED UPON MATÉ AND PROCESS OF MAKING THE SAME

David Edward Fink, Kansas City, Mo.

No Drawing. Application October 22, 1937, Serial No. 170,471

3 Claims. (Cl. 99—28)

This invention relates to a composition of matter in the nature of a beverage product and particularly the method of producing the same, and the primary object of the invention is the provision of a product, having maté as its principal ingredient, which product is produced through the employment of means and methods specifically hereinafter set down.

One of the important aims of this invention is the provision of a process of making a product of the aforementioned character, which will condition maté for use as a drink base, or as a concentrate that may be sold in bulk for commercial or soda fountain use. The drink having the product as a base thereof, being in the nature of so-called "soft drinks" that are produced in bottling plants and widely distributed in case lots.

The product maté forming the principal ingredient of the product contemplated by this invention, is well-known in the art. It is better known as yerba maté, or Paraguay tea. Technically some authorities employ the term *Ilex paraguayensis,* and it is common knowledge that the product originates in South America, and particularly in Paraguay and Brazil. Throughout the following specification and appended claims therefore, the term maté will be employed to mean that product, which as above set down, has been called yerba maté, *Ilex paraguayensis,* herva maté, or Paraguay tea.

The product may be purchased on the open market and it is preferable in producing a product of the nature contemplated by this invention, to start with an unadulterated maté which is free from foreign matter in the nature of fibrous materials, stems, or particles from other parts of the tree, than the leaves per se.

Maté contains some objectionable elements along with the stimulating elements, and the said objectionable constituents of the leaves must be removed. Caffeine is contained in the leaves as is tannin and illicin. These last two mentioned ingredients must be removed, and the process herein disclosed, is effective in accomplishing such removal. Suitable acids are employed in specially treating maté and while there will always be a certain amount of tannin remaining in the resultant solution, or concentrate, the following example has been found commercially advantageous.

A batch of the product may be made by starting with nine pounds (9 lbs.) of maté, ten gallons (10 gal.) of water, and enough acid to acidulate the water during the first steps of the process.

The ten gallons (10 gal.) of water may be considered the vehicle and at the outset it is placed in an open receptacle and mixed with enough of any one of a suitable acid so as to obtain a slight acid reaction when the mixture is tested. Hydrochloric or sulphuric acid may be used as an example, and approximately four ounces (4 oz.) of either to the ten gallons (10 gal.) of water, will be found sufficient in the majority of cases. After the acid and water has been mixed, the resultant solution is brought to a boil and the maté (9 lbs.) is introduced. Introduction is made while agitation, or stirring, takes place, and after boiling is definitely started, subsequent to the addition of the maté, it is caused to boil for ten minutes (10 min.). There will be some solids in the product produced, as just set down, and the same should be removed by settling.

Because of the fluctuation in the natural conditions of maté, it will be difficult to always produce a liquid at this point in the process which does not contain the bitter principle, illicin. In a great majority of cases however, when the maté is boiled in the acidulated water, this bitter principle is removed. The mixture however, will contain an alkaloid (caffeine) and an amorphous form of tannin.

The taste test must be applied at this juncture to determine the presence of illicin, if there, by the tell-tale objectionable bitter reaction, then reboiling must take place with a slight amount of acid, such as sulphuric added to neutralize and destroy the remaining illicin. This reboiling need not be for a period more than approximately five minutes (5 min.), after which the test to determine the presence of tannin should be conducted. The U. S. P. test for tannin may be used and if tannin is present, it should be precipitated out through the use of albumen or gelatin.

Obviously, if albumen is used to remove the tannin, the solution must again be heated in order to divide out the albumen. If gelatine is used to remove the tannin, it will settle, but since the use of gelatine slows down the production of the material, it is preferred to use albumen for the removal of tannin.

None of the steps above mentioned, will effect the properties of the maté, which makes it so desirable for use as a drink base.

In some instances, a slight excess of acid may be present. This acid must be neutralized by adding calcium carbonate to the solution while it is being stirred. These small amounts of calcium carbonate should be added until slight turbidity occurs and then the calcium carbonate will settle out and the solution will clarify.

At the conclusion of the performance of the necessary and possible (if needed) steps, above set down, the approximately ten gallons (10 gal.) of solution has added thereto, two hundred and twenty pounds (220 lb.) granulated sugar. Enough water to make thirty six gallons (36 gal.) of a finished product is combined with the said ten gallons (10 gal.) of solution when the two hundred twenty pounds (220 lb.) of sugar is added, and the resultant sweetened solution is brought to a boil while stirring takes place to prevent the sugar from caramelizing. Boiling takes place for but a short time, or until the sugar is completely dissolved and intimately combined to create a syrup. Straining may next take place so as to remove impurities in the nature of any solids that might be suspended within the syrupy product, after which phosphates and aromatics may be added to flavor and improve the taste.

The thirty six gallon (36 gal.) batch produced as above set down and in accordance with this invention, is in the nature of a concentrate or regular heavy syrup that may be used in the production of bottled drinks or soda fountain drinks. It is also useful in mixing cocktails, highballs, and other drinks containing spirituous liquor, because when this syrup is so employed, breath of the user is sweetened and completely purged of any odor of whiskey, gin, or other liquor that might have been used in a particular drink.

This product, when used in any of the ways disclosed herein, is also effective in neutralizing bad breath in most cases where smoking, eating foods having objectionable odors, and where physical conditions of the body produce chemical changes resulting in bad breath.

As a soft drink, the syrup is used in precisely the same way as other soft drink syrups in that one ounce (1 oz.) of syrup is used in a six ounce (6 oz.) bottle with five ounces (5 oz.) of carbonated water. The said one ounce (1 oz.) of syrup which is used in producing a six ounce (6 oz.) bottle, comprises seventy five percent (75%) of the concentrate, or syrupy product, made as aforesaid, with twenty five percent (25%) U. S. P. simple syrup. The addition of syrup of the well-known ordinary character, builds the nature of the entire bottled soft drink to a point where is is a thoroughly sweetened body.

In producing what is known as a "dry mixer" three ounces (3 oz.) of this syrupy product is used in a twenty four ounce (25 oz.) bottle of carbonated water. For soda fountain service, it has been found desirable to use a mixture of seventy five percent (75%) of the said concentrate, or syrupy mixture, with twenty five percent (25%) U. S. P. simple syrup, to a standard six ounce (6 oz.) glass which is filled with carbonated water after the introduction of one ounce (1 oz.) of syrup made up as aforesaid.

As a final example of a use for the concentrate, the same may be bottles in four ounce (4 oz.) pints and quart containers for service in the home or in commercial establishments.

The maté drink produced as herein described, will have the stimulating property so well known to be obtained from the use of maté, but the heretofore objectionable bitter taste and therefore, repulsive reaction on the part of the user, will be absent. The noninjurious, habit forming character of the maté is preserved and passed on to the consumer through the employment of this process and the many useful advantages arising from the invention, at once become obvious to those skilled in the art.

Manifestly slight alterations in procedure and elements used may be employed without departing from the broad spirit of this invention, and it is desired to be limited only by the scope of the appended claims.

Having thus described the invention, what is claimed as new and desired to be secured by Letters Patent is:

1. The process of preparing a beverage ingredient from maté which comprises boiling the leaves of maté in a solution of faintly acidulated water for a period of approximately ten minutes (10 min.); removing any tannin from the resulting solution; and forming a syrupy concentrate by adding sugar and water to the said resulting solution while boiling.

2. The process of preparing a beverage ingredient from maté which comprises boiling the leaves of maté in a solution of acid and water for a period of approximately ten minutes (10 min.); removing any tannin from the resulting solution; neutralizing any excess acid in said solution; and forming a syrupy concentrate by adding sugar and water to the said resulting solution while boiling.

3. The process of preparing a beverage ingredient from maté which comprises boiling the leaves of maté in a solution of water and hydrochloric acid until the illicin in the maté leaves is eliminated; removing any tannin from the resulting solution; neutralizing any excess acid in said solution by the addition of calcium carbonate; and adding sugar and water to form a syrupy concentrate.

DAVID EDWARD FINK.